[11] 3,583,814

| | | | |
|---|---|---|---|
| [72] | Inventor | Carl K. Shumway, Jr. Penefield, N.Y. | |
| [21] | Appl. No. | 784,650 | |
| [22] | Filed | Dec. 18, 1968 | |
| [45] | Patented | June 8, 1971 | |
| [73] | Assignee | Shumway Optical Instrument Corporation Rochester, N.Y. | |

[54] OPTICAL LEVEL
29 Claims, 4 Drawing Figs.

[52] U.S. Cl. ..................................... 356/150,
33/206, 356/110, 356/153, 356/249
[51] Int. Cl. ....................................... G01c 9/20,
G01g 13/19
[50] Field of Search........................... 356/249,
138, 106—110, 153, 150; 33/206

[56] References Cited
UNITED STATES PATENTS

| | | | |
|---|---|---|---|
| 2,375,356 | 5/1945 | Flint........................... | 33/206.2B |
| 2,460,836 | 2/1949 | Lovins......................... | 356/249 |
| 2,660,916 | 12/1953 | Zobel et al................... | 356/109 |
| 2,876,673 | 3/1959 | Hamilton..................... | 356/249 |
| 3,044,343 | 7/1962 | Poitevin De Fontguyen | 356/249 |
| 3,480,367 | 11/1969 | Husted et al.................. | 356/138 |

FOREIGN PATENTS

| | | | |
|---|---|---|---|
| K22,233 | 10/1955 | Germany...................... | 356/106 |
| 15,079 | 6/1914 | Great Britain................ | 356/249 |
| 745,529 | 2/1956 | Great Britain................ | 356/249 |
| 784,042 | 10/1957 | Great Britain................ | 356/110 |
| 869,617 | 5/1961 | Great Britain................ | 356/249 |

*Primary Examiner*—Ronald L. Wibert
*Assistant Examiner*—J. Rothenberg
*Attorney*—R. A. Benziger

ABSTRACT: An optical level includes a pool of mercury sealed in a container under a transparent glass window with the space between the bottom surface of the window and the surface of the mercury filled with a fluid having the same index of refraction as the window glass. The window and the fluid then form a single refractive wedge for light reflected from the mercury surface. The upper perimeter of the window is coated to reflect light that can be compared with light reflected from the mercury surface by determining parallax or interference to adjust for level or find local vertical.

PATENTED JUN 8 1971 3,583,814

INVENTOR.
CARL K. SHUMWAY Jr.

BY
Crumpston, Shaw & Stephens
ATTORNEYS

OPTICAL LEVEL

THE NEED FOR IMPROVEMENT

Accurate level and local vertical determinations are required for many industrial and scientific purposes. Prior art devices to make these determinations included spirit or bubble levels which were not sufficiently accurate, pendulous mirror devices that were both awkward and inaccurate, and various other devices that were complex, inconvenient, and insufficiently accurate. Mercury pools have been used as level reference surfaces, but they have been dangerous and expensive to work with because the mercury surface quickly becomes dirty, and the mercury pool gives off toxic fumes.

The objects of the invention include, without limitation, overcoming the deficiencies of prior art optical leveling instruments, and providing a leveling instrument that is simple, convenient to use, economical to make, reliable, durable, and more accurate than any previous devices.

THE INVENTIVE SOLUTION

The inventive level uses a mercury reference surface in a way that overcomes the previous disadvantages of mercury pools and greatly increases the accuracy and versatility of the level over previous devices. The mercury pool is sealed in a container under a transparent glass window, and a transparent fluid medium having the same index of refraction as the window glass fills the space between the mercury surface and the bottom surface of the window. This effectively eliminates any refraction at the bottom surface of the window and forms a single refractive wedge between the top surface of the window and the surface of the mercury. Also, the proper fluid materials keep the mercury surface clean and bright.

The upper surface of the window is optically polished and made optically flat or curved to a predetermined radius and coated to determine its reflectiveness. Preferably the periphery of the window is coated to reflect substantially all incident light, and the central area of the window can be coated to partially reflect light if desired.

For null or parallax determinations, collimated light is directed downward onto the instrument window and reflected from the peripheral mirror and the surface of the mercury. If the instrument is not level, a wedge angle alpha exists between the upper surface of the window and the surface of the mercury and the reflected rays from the mirror and the mercury differ not only by the conventional autocollimation factor of $2\alpha$, but this angle is amplified by the index of refraction N of the glass and fluid wedge to increase the parallax angle between the two reflected rays to $N2\alpha$ and increase the apparent resolution of any reading telescope or collimator.

After the inventive instrument is levelled by a parallax null, a more refined levelling can be achieved by directing monochromatic light onto the instrument window and determining the interference fringes between light reflected from the window surface and light reflected from the mercury surface. Besides adjusting the instrument, the surfaces or equipment supporting the instrument can be adjusted to level, local vertical can be found above the level, and various other optical devices can work from the level determined by the inventive instrument.

SUMMARY OF THE INVENTION

The inventive optical level includes: a pool of light-reflective liquid, a transparent window over the liquid, the space between the window and the surface of the liquid being filled with a transparent fluid medium having the same index of refraction as the window, and the top surface of the window being optically polished. Levelling with such a device is accomplished by directing light onto the instrument window, comparing the light reflected from the window with the light reflected from the surface of the reflective liquid, and making a mechanical adjustment based on the comparison.

THE DRAWINGS

DETAILED DESCRIPTION

The drawings show preferred embodiments of the distinctive portion of the inventive level. For simplicity, the illustrated device will be described and its operations shown with the understanding that those skilled in the art can readily associate the illustrated level with telescopes, collimators, mounting trivets, and other optical equipment and can arrange the inventive device for use in a multitude of industrial and scientific applications once its principles are taught.

Through the specification and claims, the words "top" and "bottom," "upper" and "lower," "over" and "under" and the like refer to the inventive level as oriented for operation with its transparent window disposed above its pool of reflective liquid. The inventive level can be carried about without regard to its operating orientation.

Figure 1:
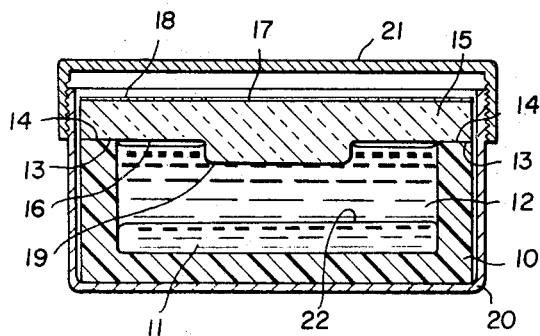
FIG. 1 is a diametrical, cross-sectional view of the cylindrical body of an optical level according to the invention.
Figure 2:
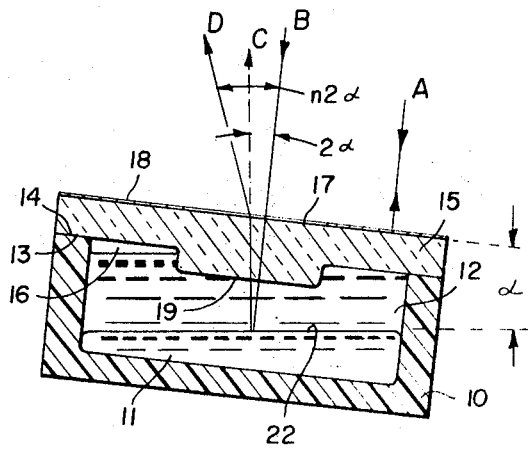
FIG. 2 shows the device of FIG. 1 in an exaggerated, tilted position to illustrate its operation as a level.
Figure 3:
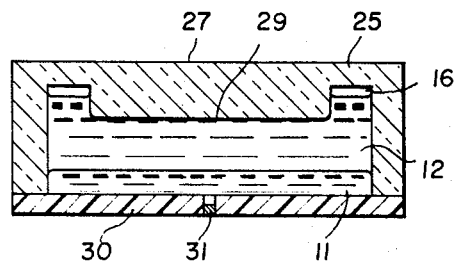
FIGS. 3 and 4 are diametrical cross-sectional views of alternative structures for the inventive level.
Figure 4:
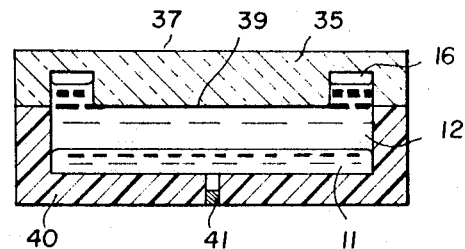

Alternative preferred structures for the inventive level are best shown in FIGS. 1, 3 and 4, and operation of the level is best shown in FIG. 2. The structure of the level will be described first.

The level of FIG. 1 includes a container 10 formed as a shallow, cylindrical cup containing a pool of reflective liquid 11. The top 13 of container 10 is preferably flat and sealed closed by window cover 15 having a lower peripheral surface 14 that is also flat and engages top 13 of container 20. A transparent fluid medium 12 fills the space between the upper surface 22 of liquid 11 and the bottom central surface 19 of window 15. Fluid medium 12 can be a liquid, a gas, or a combination of both. If fluid medium 12 is partially liquid, the liquid portion fills the space between surfaces 22 and 19 so that any gas, vapor, or partial vacuum 16 is above the level of bottom central window surface 19. Cement, epoxy resin, or other material seals cover 15 to container 10.

Reflective liquid 11 is preferably mercury in either a pure form or containing mineral material. Small quantities of gold, platinum, or other mineral material dissolved in the mercury can be used to change the color of the mercury surface 22 to reflect light of a different color from incident light or to vary the surface tension of the mercury in pool 11.

Transparent medium 12 is preferably a mixture of glycerin and water or glycerin and alcohol floating on the mercury on pool 11. Glycerin is hydroscopic and tends to draw water molecules and other impurities away from the mercury to keep the mercury surface 22 clean and bright.

With a combination of mercury in pool 11 and glycerin and water or glycerin and alcohol as fluid 12, the preferred arrangement is to fill container 10 completely with fluid medium 12 heated to near the boiling point and seal container 10 so that as fluid medium 12 cools, it is under a pressure substantially less than atmospheric pressure. If the tension thus placed on fluid medium 12 exceeds its elastic limit, partial vacuum openings 16 are formed above bottom central window surface 19 and contain vapors of water or alcohol. This does not affect the operation of the level since bottom central surface 19 of window 15 is well below the upper surface of liquid 12. Also it is not essential that the elastic limit of liquid 12 be exceeded or that any spaces 16 contain a vapor.

Fluid medium 12 can also be solely a gas or combination of a liquid such as an inert, transparent, optical oil with the space above the oil filled with a dry, inert gas such as nitrogen. Such arrangements are also preferably under a pressure less than atmospheric pressure, either through assembly in a low-pressure environment or at an elevated temperature for contraction after assembly.

Window 15 is preferably formed of glass, and fluid medium 12 has substantially the same index of refraction as the glass in window 15. This effectively eliminates bottom central surface 19 as a refracting surface and makes a continuous refraction wedge between the top of window 15 and surface 22 of pool 11. As further assurance that no refraction errors are introduced by surface 19, it is preferably parallel with top surface 17 of window 15.

The top surface 17 of window 15 is optically polished and made flat or with a predetermined curvature. Such a predetermined curvature could have the same radius as the earth's surface or the surface of another celestial body, or some other desired radius. Surface 17 is also coated with materials to determine its reflectiveness, and preferably such coating forms a mirror 18 around the peripheral area of window 15. Mirror 18 then surrounds bottom central surface 19 of window 15, and covers the peripheral areas of pool 11 where the liquid is most curved by surface tension. Also, if desired, a coating on surface 17 can make the central region of cover 15 a partially reflective surface above bottom central surface 19. Such a semireflective coating is useful for operations such as comparing interference fringes.

Container 10 is housed in case 20 having an upper rim threaded to receive protective cover 21. Case 20 can be fitted in a mounting trivet or secured to a machine or equipment to be leveled. An iris diaphragm can be arranged over surface 17 inside of cover 21 if desired. Also, a variety of optical equipment, including telescopes, collimators, and other devices can be associated with the inventive level.

FIG. 3 shows a level containing the same preferred ingredients described above in a liquid pool 11, and a transparent fluid medium 12 above pool 11. Glass window 25 is formed as a container and has a bottom central surface 29 extending down into fluid medium 12 so that any space 16 is above bottom central surface 29. A bottom piece 30 is secured over the open bottom of window 25 and the resulting container is inverted to be filled with liquid materials 11 and 12 through an opening 31 that is sealed after filling.

Another form of container for the inventive level is shown in FIG. 4, containing a liquid light-reflective pool 11, a transparent medium 12, and having a window 35 with a bottom central surface 39 extending below the surface of fluid medium 12 and below any space 16. A closure piece 40 is secured to window 35 and the level is inverted for filling through an opening 41 which is sealed after the level is filled.

The characteristics of respective top surfaces 27 and 37 of the levels of FIGS. 3 and 4 are as previously described. The coefficients of thermal expansion of the two-part containers of FIGS. 1, 3, and 4, should be equal to ensure accurate operation throughout the desired range of temperatures.

The operation of the inventive level is best illustrated in FIG. 2. After the level is arranged roughly level for the desired levelling operation, collimated light from above is directed down on surface 17. Light rays A are reflected from mirror surface 18 and light rays B are transmitted through window 15 and are reflected from surface 22. If the instrument is not level a wedge angle alpha exists between surfaces 17 and 22 and this reflects the rays from surface 22 toward C at $2\alpha$. In addition, the wedge refracts the reflected light from surface 22 by the index of refraction N to direct such light toward D at the angle $N\,2\alpha$. Thus the $2\alpha$ factor is amplified by the refraction index N to increase the apparent resolution of a telescope or collimator viewing the level.

A telescope or collimator receiving the reflected light from rays A & B can determine the existence of parallax caused by the reflection and refraction angles introduced by the wedge angle to show that the instrument is not level. The instrument is then adjusted to eliminate such parallax and set the window level and parallel with the mercury with great accuracy. Such adjustment can be made on the instrument itself or in equipment or machinery on which the instrument is mounted.

After levelling by parallax, the level accuracy can be increased by interferometric determination. For this, preferably monochromatic light is directed onto the instrument, and the central area of surface 17 is coated with a partially reflective coating. Some light is reflected from surface 17 and some light is reflected from surface 22 to form interference fringes which are reduced by adjustment of the instrument for extremely precise levelling.

Local vertical can also be determined with great accuracy with the inventive level. The location of a source of light above the inventive level can be adjusted in accordance with the reflected light from the mercury pool to bring the source accurately to a point directly vertical over the level. Also, from such levelling and vertical-finding operations, other optical equipment can be oriented for a variety of purposes.

Thus, the invention accomplishes its objects in providing a far more accurate levelling instrument that is still simple, economical, convenient, reliable and durable. Persons wishing to practice the invention should remember that other embodiments and variations can be adapted to particular circumstances. Even though one point of view is necessarily chosen in describing and claiming the invention, this should not inhibit broader or related applications within the spirit of the invention. For example, a variety of materials, reflective liquids, refractive liquids and gasses can be used in making the inventive level, and the liquid container and covering window can have a variety of shapes.

I claim:
1. An optical level comprising:
   a. a pool of light-reflective liquid;
   b. a transparent fluid medium disposed above said light-reflective liquid;
   c. a solid window disposed over said transparent fluid medium;
   d. means for containing said light-reflective liquid and said transparent fluid medium sealed under said window;
   e. the bottom central surface of said window being disposed above the surface of said light-reflective liquid in all operating positions of said level;
   f. said fluid medium evenly filling the space between said surface of said light-reflective liquid and said bottom central surface of said window in all operating positions of said level;
   g. the central portion of said window being transparent;
   h. said fluid medium between said bottom central window surface and said surface of said light-reflecting liquid having substantially the same index of refraction as said transparent window portion; and
   i. the top surface of said window being optically polished.
2. The level of claim 1 wherein predetermined regions of said top surface of said window are coated to determine the light reflectance of said regions.
3. The level of claim 2 wherein the periphery of said top surface of said cover has a coating that reflects substantially all incident light.
4. The level of claim 3 wherein the central portion of said top surface of said window has a coating that partially reflects incident light.
5. The level of claim 1 wherein said top surface of said window is optically flat.
6. The level of claim 1 wherein said top surface of said window is formed with a predetermined curvature.
7. The level of claim 1 wherein said light-reflective liquid comprises mercury.
8. The level of claim 7 wherein said fluid medium comprises glycerin and water.
9. The level of claim 7 wherein said fluid medium comprises glycerin and alcohol.
10. The level of claim 7 wherein said fluid medium comprises an inert oil and a dry, inert gas disposed above said oil with said oil filling the space between said surface of light-reflective liquid and said bottom surface of said window.
11. The level of claim 7 wherein said mercury contains mineral material.

12. The level of claim 11 wherein said mineral material colors said surface of said mercury for reflecting light differing in color from incident light.

13. The level of claim 11 wherein said mineral material comprises material effecting a change in the surface tension of said mercury.

14. The level of claim 1 wherein said fluid medium is under a pressure less than atmospheric pressure.

15. The level of claim 1 wherein said top surface of said window and said bottom central surface of said window are substantially parallel.

16. The level of claim 1 wherein said containing means comprises a shallow, liquid container, said window comprises a cover for said container, and sealing means secures said window to said container.

17. The level of claim 1 wherein said window comprises an open-bottomed container, and a bottom member is sealed to the bottom of said window to close said container.

18. The level of claim 1 wherein an under surface of said window surrounding said bottom central surface of said window is disposed above said bottom central surface in all operating positions of said level.

19. The level of claim 1 wherein said light-reflective liquid comprises mercury, and predetermined regions of said top surface of said window are coated to determine the light-reflectance of said regions.

20. The level of claim 19 wherein said fluid medium comprises glycerin and water under a pressure less than atmospheric pressure.

21. The level of claim 20 wherein the periphery of said top surface of said cover has a coating that reflects substantially all incident light, said top surface of said window and said bottom central surface of said window are substantially parallel, and an under surface of said window surrounding said bottom central surface of said window is disposed above said bottom central surface in all operating positions of said level.

22. The level of claim 21 wherein said mercury contains mineral material that colors the surface of said mercury for reflecting light different in color from incident light, said window comprises an open-bottomed container, and a bottom member is sealed to the bottom of said window to close said container.

23. An optical leveling method comprising:
a. arranging a windowed container of a pool of light-reflective liquid with the window facing upward in position for levelling;
b. providing a light-reflective coating on the windowed top surface of said container;
c. directing light downward from a source onto said windowed container so that a portion of the light is reflected from said top surface and another portion is reflected through the window from the surface of said light-reflective liquid;
d. optically multiplying any angular difference between the portion of said light reflected from the top surface of said container and the portion of said light reflected from the surface of said light-reflective liquid by a value substantially greater than 1;
e. comparing the portion of the light reflected from the top surface of said container with the portion of said light reflected from the surface of said light-reflective liquid in said container to determine any angular difference therebetween; and
f. making a mechanical adjustment based on the results of said comparison.

24. The method of claim 23 wherein said adjustment is made to bring said top window surface parallel with said liquid surface.

25. The method of claim 23 wherein said adjustment is made to bring said source closer to a position vertically above said level.

26. The method of claim 23 including using a light-refractive medium between said top window surface and said reflective surface to amplify any deviation angle between said light reflected from said window and said light reflected from said liquid.

27. The method of claim 23 wherein said comparison comprises observing interference fringes between said light reflected from said window and said light reflected from said liquid.

28. The method of claim 23 wherein said adjustment comprises moving a structure supporting said container.

29. The level of claim 1 wherein said transparent fluid medium is hydroscopic.